United States Patent [19]
Parker

[11] Patent Number: 4,655,628
[45] Date of Patent: Apr. 7, 1987

[54] PIVOTAL ATTACHMENT MEANS EMPLOYING A SPRING CLIP

[75] Inventor: Donald L. Parker, Middletown, Ohio

[73] Assignee: General Motors Corporation, Detroit, Mich.

[21] Appl. No.: 837,299

[22] Filed: Mar. 7, 1986

[51] Int. Cl.⁴ .......................... F16C 11/06; F16D 1/12
[52] U.S. Cl. ...................................... 403/163; 403/70; 74/512
[58] Field of Search .................. 403/69, 70, 163, 155, 403/71; 74/512

[56] References Cited
U.S. PATENT DOCUMENTS
4,132,127  1/1979  Fulmer .................................. 74/512

FOREIGN PATENT DOCUMENTS
612244   1/1961  Canada .................................. 403/163
1202134  7/1959  France .................................. 403/163

Primary Examiner—Andrew V. Kundrat
Attorney, Agent, or Firm—D. D. McGraw

[57] ABSTRACT

A simplified pushrod to brake pedal actuating arm attachment uses a spring clip held on the pushrod with several finger retainers. A pair of spring clip legs projecting inward near the pushrod eye ride on a grooved pin which is attached to the brake pedal. The outer ends of the spring clip legs pop into a groove and retain the clip and the pushrod eye in position on the actuating arm pin so that forces may be transmitted between the actuating arm and the pushrod through the pin.

3 Claims, 5 Drawing Figures

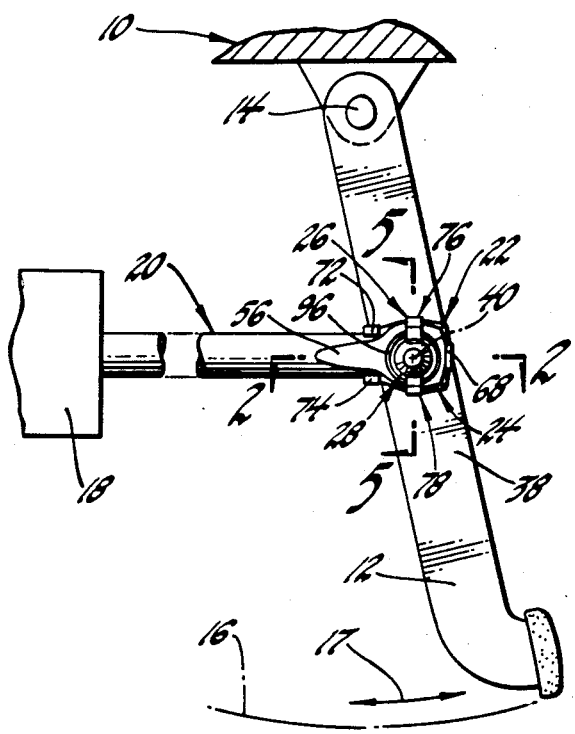
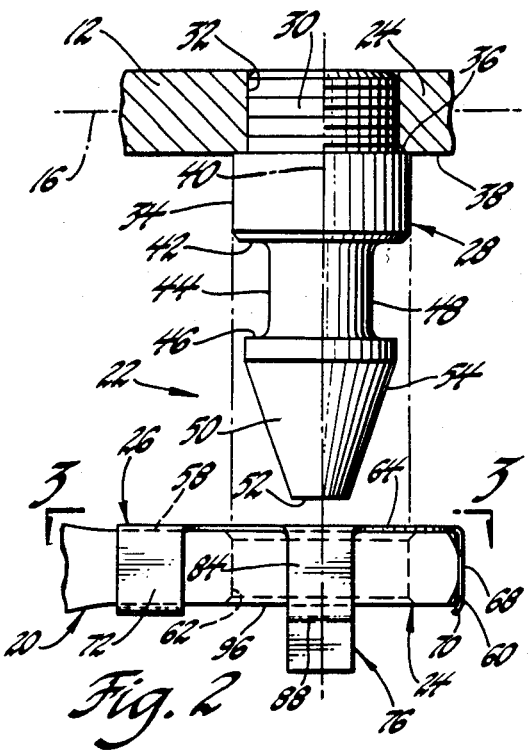
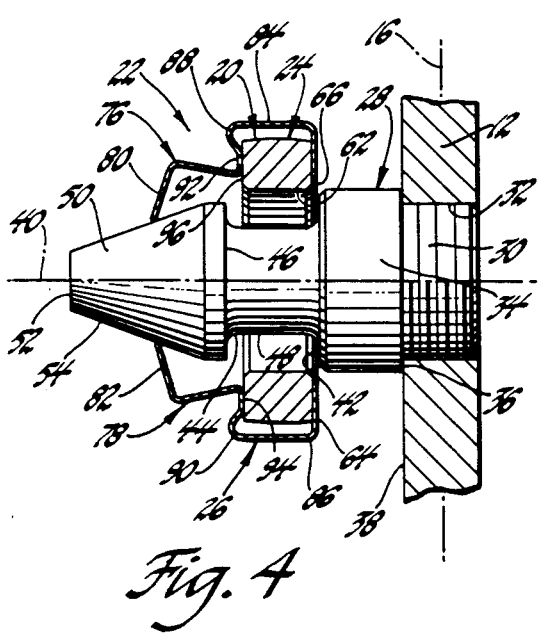
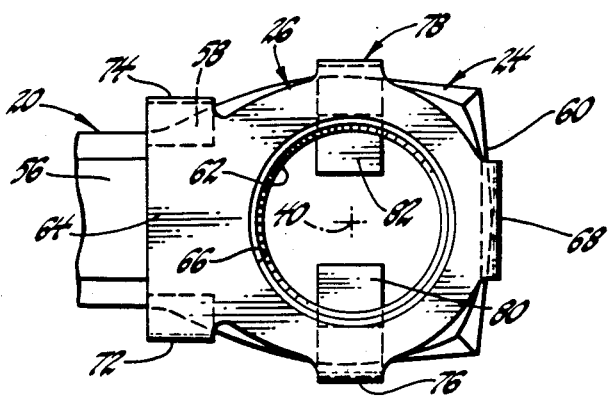
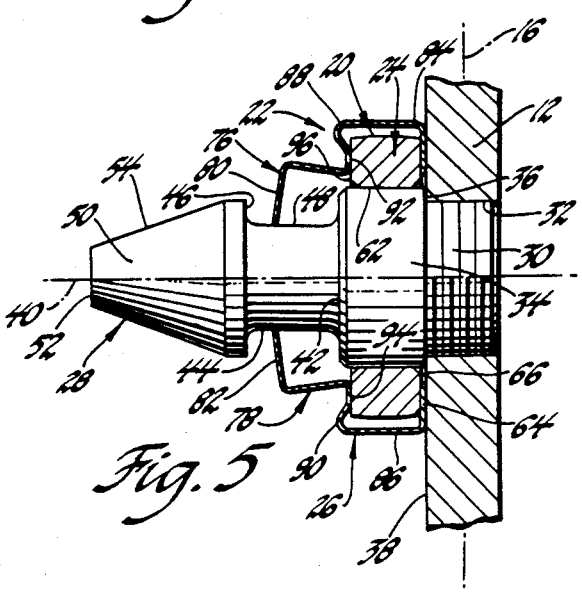

PIVOTAL ATTACHMENT MEANS EMPLOYING A SPRING CLIP

The invention relates to attachment means for attaching a pushrod for pivotal relative movement to an actuating arm moveable in a plane through an arc, and more particularly to such an attachment means using a spring clip to retain the pushrod in place.

The attachment means embodying the invention is particularly applicable to vehicle brake pedal and pushrod arrangements wherein one end of the pushrod is pivotally attached to the brake pedal so as to be able to transmit forces between the brake pedal arm and the brake actuating mechanism such as a brake booster.

Typical attachment arrangements in current use for brake booster pushrods to brake pedal arms in automotive vehicles are more complex and require extensive assembly time in relation to the invention herein disclosed and claimed. Typical production arrangements currently use a pin welded to the side of the pedal arm on which a beveled eye end of the pushrod is placed by the assembler. The assembler then places a wavy washer over the pin, a soft washer for noise dampening purposes, and then installs a securing device for all the parts. The securing device may be either a clip fitting in a groove near the end of the pin, the clip having to be manually inserted around the groove, or a pin or key inserted in a cross-drilled hole in the pin and secured in place. The assembly procedure requires the assembler to be positioned on his back in each vehicle for a period of time, and required additional time for him to move into and out of this position in each vehicle. Furthermore, he may drop one or more parts, with additional delays to pick them up or replace them.

By employing the mechanism of the invention, the assembler merely places the pushrod and clip over the pin and pushes it into place. The entire attachment is then complete. It can often be done by touch alone. He does not have to serially assemble several elements on the pin and does not have to enter the vehicle, lie on his back, make the assembly and then get back out of the vehicle from this position.

In one aspect of the invention, it involves attachment means for attaching a pushrod for pivotal relative movement to an actuating arm moveable in a plane through an arc. The attachment means comprises a pin secured to and extending from one side of the actuating arm in a direction perpendicular to the plane of movement of the actuating arm. The pin has a bearing land adjacent the side of the actuating arm, a groove beyond the bearing land away from the actuating arm, and a tapered end extending away from the actuating arm, the tapered end defining a generally frusto-conical cam surface of increasing diameter from the outer end thereof toward the groove. The tapered end at its inner end provides a shoulder which forms one side wall of the groove. The bearing land provides a shoulder forming the other side wall of the groove. The pushrod has one end enlarged with a cross hole or opening therethrough forming an eye which is of such a diameter as to be received over the pin and to fit about the bearing land in pivotal bearing relation. A clip is secured to the pushrod eye in such a manner that it is preassembled and remains on the eye before assembly to the pin and actuating arm takes place.

The clip has a planar clip body with an opening therethrough which is arranged to be received over the pin and to also pivotally fit about the bearing land. The planar clip body is positioned between the pushrod eye end and the actuating arm.

The clip planar body has one finger extending laterally therefrom and arranged to engage the outer end of the pushrod enlarged end to prevent movement of the clip in one direction on the pushrod. The clip planar body has another pair of fingers which also extend laterally from the planar clip body in a direction generally parallel to the first finger, the pair of fingers being arranged to receive the throat of the pushrod between them on the other side of the enlarged end from the pushrod outer end. This is a smaller section of pushrod than the enlarged end forming the eye so that the pair of fingers limit the movement of the clip along the pushrod toward the pushrod outer end. This maintains the clip body opening substantially in axial alignment with the pushrod eye cross hole.

The clip also has a pair of spring legs which likewise extend laterally from the planar clip body in a generally parallel direction to the fingers. These legs are on opposite sides of the clip body openings and have outer ends bent so as to approach the axis of the clip body opening to the extent that the leg outer ends are spaced apart for a distance which is less than the outer diameter of the pin tapered end forming the shoulder and one side of the groove. In their free condition they are also spaced apart for a distance which is less than the diameter of the bottom of the groove.

The attachment means is assembled by first installing the clip on the pushrod so that the planar body is on one side of the pushrod enlarged eye end. The clip and the pushrod eye are then generally axially aligned with the tapered outer end of the pin, either visually or by touch, and pushed onto the pin by movement of the pushrod and clip subassembly axially relative to the pin, with the clip planar body being on the side toward the actuating arm. This movement causes the pin tapered end to move through the clip body opening and the cross hole forming the pushrod eye and engage the clip spring legs at their outer ends. As the clip and pushrod eye are further moved axially toward the actuating arm, the spring leg outer ends are moved outwardly by the pin tapered end in camming relation to resiliently spread the legs apart. When the leg outer ends have passed the first shoulder and groove side wall, the outer ends of the legs snap into the groove and hold the pushrod eye and the clip on the pin in operative relation so that forces are then capable of being transmitted between the pushrod and the actuating arm through the pin. The clip holds the pushrod against removal, with the planar body of the clip acting as a washer between the side of the pushrod eye and the side of the brake pedal arm. It can be seen that this is a very quick assembly arrangement because it is quite easy to place the opening of the clip planar body and the cross hole of the eye over the tapered end of the pin and simply push it into position.

The invention also relates to the particular clip forming a part of the attachment means.

In the drawing:

FIG. 1 is a somewhat schematic side elevation of a brake pedal actuating arm and a booster pushrod attached by the attachment means embodying the invention.

FIG. 2 is a preassembly fragmentary elevation view of the attachment mechanism of FIG. 1, with parts broken away and in section and taken in the direction of arrows 2—2 of FIG. 1.

FIG. 3 is a fragmentary elevation view, with parts broken away, of the assembled clip and pushrod eye end before they are assembled on the pin.

FIG. 4 illustrates an intermediate step in the assembly of the pushrod eye and clip on the actuating arm pin.

FIG. 5 is a fragmentary cross-section view, taken in the direction of arrows 4—4 of FIG. 1 showing the completed assembly.

In FIG. 1, the mechanism embodying the invention is incorporated in a vehicle brake actuating arrangement. The vehicle 10 has a brake pedal actuating arm 12 pivotally attached thereto at 14. Therefore the actuating arm is moveable arcuately in a plane 16 as illustrated by arcuate arrow 17 to actuate and release the vehicle brakes. This plane of movement is also illustrated in FIGS. 2, 4 and 5. The device 18 to be actuated by movements of the arm 12 may be a brake booster by way of example. A pushrod 20 is provided for actuating device 18, as is well known in the art. Pushrod 20 is attached to the actuating arm at an appropriate position determined by the desired pedal actuating arm ratio so that braking forces may be transmitted between arm 12 and push rod 20. The attachment arrangement 22 is the subject of the invention herein claimed. It is shown in greater detail in FIGS. 2 through 5.

The attachment arrangement 22 includes an enlarged end 24 of pushrod 20, a spring clip 26, and a pin 28. Pin 28 is suitably secured to actuating arm 12 by appropriate means such as the pin threaded end 30 and the threaded opening 32 into which the pin is tightly threaded. Other arrangements may be made without departing from the invention. It may be desirable to stake the pin threaded end 30, for example, to further assure its retention in threaded opening 32. Pin 28 is provided with a bearing land 34 which is of somewhat larger diameter than the actuating arm threaded opening 32 so that the shoulder 36 engages the actuating arm side 38 from which pin 28 extends. The axis 40 of the pin is perpendicular to the plane of movement 16 of the actuating arm 12. The other side of bearing land 34 from actuating arm 12 provides a shoulder 42 defining a side wall of a groove 44 extending circumferentially about the pin axis 40. The other side wall of groove 44 is defined by another shoulder 46. The groove has a bottom wall 48 extending between the two shoulders 42 and 46, the diameter of the bottom wall being less than the outer diameter of shoulder 46. Shoulder 46 is formed by the inner end of the pin tapered end 50, which is preferably frustoconical and extends from shoulder 46 to the pin outer end 52. The diameter of the pin outer end 52 is substantially less than the outer diameter of shoulder 46 so that the tapered end 50 provides a tapered camming surface 54 between end 52 and shoulder 46, the diameter of camming surface 54 increasing as it approaches shoulder 46. The diameter of pin outer end 52 is also smaller than the diameter of the groove bottom wall 48.

The pushrod shank or throat 56 connects with the pushrod enlarged end 24, and is smaller than the pushrod enlarged end, at least as seen in FIG. 3. Therefore the other side 58 of the enlarged end 24 from the pushrod outer end 60 is smaller than the enlarged end 24. The pushrod enlarged end 24 has a cross hole or opening 62 formed therethrough so that the pushrod enlarged end is an eye. The construction of the pushrod as above described is of the same type as that already in common use in production vehicles. The opening 62 is of such a size as to fit over the bearing land 34 of pin 28 in pivotal bearing relation as shown in FIGS. 2 and 5.

Clip 26 has a clip planar body 64 formed with an opening 66 which is also of a diameter such that it will fit over bearing land 34 as more particularly illustrated in FIG. 5. When the pushrod enlarged end 24 and the clip 26 are in the installed position shown in FIG. 5, their axes are coaxial with axis 40 of the pin as shown in FIG. 5. Thus, for illustrative purposes in FIGS. 2, 3 and 4 the axes of openings 62 and 66 are also in axial alignment with axis 40. Therefore this reference numeral is used to refer to the axes of each of the two openings as well as the axis of pin 28 when appropriate.

Clip 26 is provided with a first finger 68 which extends laterally from the clip planar body 64 for a distance slightly greater than the thickness of pushrod enlarged end 24, as seen in FIG. 2. The end 70 of finger 68 is preferably bent slightly inward toward the axis 40 of the clip opening 66. Clip 26 also has second and third fingers 72 and 74 which also extend laterally from the clip planar body 64 and are generally parallel to the first finger 68. These fingers also are preferably bent inward after spanning a sufficient distance to be greater than the thickness of the other side 58 of the enlarged pushrod end 24, as seen in FIGS. 1 and 2. The outer ends of fingers 72 and 74 preferably approach each other to an extent sufficient to partially surround the pushrod shank at the enlarged end side 58 when the clip is installed on the pushrod, as is also seen in those figures. By this arrangement of the three fingers, the clip may be installed on the pushrod enlarged end and held in position by the three fingers so that the axis of the clip opening 66 is substantially coincident with the axis of the enlarged end cross hole 62. The fingers prevent movement of the clip along the pushrod in either direction, as well as laterally of the pushrod to such an extent that the approximate alignment of the opening axes is maintained. Also, the clip, after being installed on the pushrod, is retained thereon to form therewith a previously assembled subassembly.

Clip 26 also has first and second spring legs 76 and 78 which extend laterally from the planar body 64 on the same side thereof as the fingers 68, 72 and 74. Legs 76 and 78 may be said to be generally parallel to the fingers, even though they have a more complicated shape as seen in cross section in FIGS. 4 and 5. Spring legs 76 and 78 are respectively provided with outer ends 80 and 82 which are bent so as to extend inwardly toward the axis 40 of the clip opening 66. The intermediate portions of the spring legs may have first portions 84 and 86 which extend laterally outward from the clip planar body 64 a sufficient distance to go beyond the thickness of the pushrod enlarged end, as seen in FIGS. 4 and 5. The legs are then reversely bent as respectively shown at 88 and 90 to provide inwardly extending surfaces 92 and 94 which are in position to engage the side 96 of the pushrod enlarged end 24 with a spring gripping action to more tightly hold the clip 26 on the pushrod enlarged end without relative axial movement. This is best shown in FIGS. 4 and 5. Spring legs 76 and 78 are then again reversely bent outwardly from surfaces 92 and 94, and then inwardly to the outer ends 80 and 82.

The attachment arrangement is preferably made as two preassembled subassemblies. One is the actuating arm with the pin 28 secured thereto. The actuating arm is mounted in position on the vehicle, being supported by its pivot 14. The other subassembly is that of the pushrod 20 and the clip 26. These two subassemblies are shown in spaced apart relation in FIG. 2. The pushrod and clip subassembly are typically already assembled as a part of the actuated device 18 so that the pushrod enlarged end 24 and clip 26 are positioned somewhere near pin 28 before the assembly is completed. At the time the assembly is to be completed, the assembler merely has to reach in under the vehicle dash, grasp the pushrod and roughly align the pushrod and clip axis 40 with the axis 40 of pin 28. Because of the size of openings 62 and 66 in relation to the size of the outer end 52 of tapered pin end 50, this only needs to be approximate and can be very quickly done, usually by feel or visually. The pushrod and clip subassembly are then simply moved axially toward pin 28 with the tapered end 50 entering the clip opening 66 and then the pushrod eye opening 62. Upon sufficient movement of the pushrod and clip in the axial direction, the outer ends 80 and 82 of spring legs 76 and 78 engage the camming surface 54 of tapered end 50 as seen in FIG. 4. This not only helps to more specifically locate the pushrod and clip subassembly axially in relation to the axis of pin 28, so that the opening or cross hole 62 is more nearly aligned with bearing land 34 as seen in FIG. 4, but also begins the attaching action. As the clip and pushrod subassembly is continued to be moved toward the actuating arm 12, the spring legs 76 and 78 are resiliently spread apart until they pass over the outer diameter of tapered end shoulder 46. They then immediately snap radially inward to the position shown in FIG. 5 so that the outer ends 80 and 82 grip the bottom wall 48 of groove 44 as seen in FIG. 5. When the snapping action occurs, the clip planar body 64 has closely approached the side 38 of the actuating arm. The clip and the pushrod enlarged end 24 are pushed completely onto the bearing land 34 as seen in FIG. 5. Because the outer ends 80 and 82 of spring legs 76 and 78 in their free position are more close together than the diameter of the groove bottom 48, they will continue to extend slightly outward from the clip planar body and the push rod and enlarged end so that they continue to resist movement of the pushrod and the clip in a direction away from actuating arm along axis 40. Therefore the pushrod and clip are maintained in tight relation with the actuating arm so that there is no loose rattling effect. The clip planar body 64 also acts as a washer between the pushrod enlarged end and the side 38 of the actuating arm 12.

The embodiments of the invention in which an exclusive property or privilege is claimed are defined as follows:

1. Attachment means for attaching a pushrod for pivotal relative movement to an actuating arm moveable in a plane through an arc, said attachment means comprising:

a pin secured to and extending from one side of the actuating arm in a direction perpendicular to the plane of movement of the actuating arm, said pin having a bearing land adjacent the actuating arm, a groove beyond said bearing land away from the actuating arm, and a tapered end extending away from the actuating arm, said tapered end defining a generally frustoconical cam surface of increasing diameter from the outer end thereof toward said groove, said tapered end at said groove defining a first shoulder forming one side wall of said groove and said bearing land defining a second shoulder forming the other side wall of said groove;

a pushrod having one end enlarged and provided with a cross hole therethrough forming an eye of such a diameter as to be received over said pin and fit about said bearing land in pivotal bearing relation;

and a clip having a planar clip body provided with an opening therethrough of such a diameter as to be received over said pin and fit about said bearing land between said pushrod one end and the actuating arm, said clip body having a first finger extending laterally therefrom and adapted to engage the outer end of said pushrod one end to prevent movement of said clip in at least one direction on said pushrod, first and second spring legs extending laterally from said planar clip body generally parallel to said first finger, said first and second legs being on opposite sides of said clip body opening and having outer ends bent so as to approach the axis of said clip body opening to the extent that said outer ends are spaced apart for a distance which is less than the outer diameter of said pin groove first shoulder, and second and third fingers extending laterally from said planar clip body and generally parallel to said first finger and adapted to receive said pushrod therebetween on the other side of said enlarged one end from said pushrod outer end and to limit movement of said clip along said pushrod toward said pushrod outer end so that said clip body opening is maintained substantially axially aligned with said pushrod cross hole when said clip is installed on said push rod, said first and second legs then acting to resist lateral removal of said clip from said pushrod;

said attachment means being assembled by first installing said clip on said pushrod and then pushing said clip and said pushrod eye onto said pin, said pin tapered end extending through said clip body opening and said cross hole and between said leg outer ends and engaging said leg outer ends in camming relation to resiliently spread said legs apart and then when said leg outer ends have passed said first shoulder said leg outer ends snapping into said groove and holding said pushrod eye and said clip on said pin in operative relation to transmit forces between said pushrod and said actuating arm through said pin.

2. Attachment means attaching a pushrod for pivotal relative movement to an actuating arm moveable in a plane through an arc, said attachment means comprising:

a pin secured to and extending from one side of the actuating arm in a direction perpendicular to the plane of movement of the actuating arm, said pin having a bearing land adjacent the actuating arm, a groove beyond said bearing land away from the actuating arm, and a tapered end extending away from the actuating arm, said tapered end defining a cam surface of increasing diameter from the outer end thereof toward said groove, said tapered end at said groove defining a first shoulder forming one side wall of said groove and said bearing land defining a second shoulder forming the other side wall of said groove;

a pushrod having one end enlarged and provided with a cross hole therethrough forming an eye receiving said pin therethrough and fitting about said bearing land in pivotal bearing relation;

and a clip having a planar clip body provided with an opening therethrough receiving said pin therethrough and fitting about said bearing land between said pushrod one end and the actuating arm so that said clip body acts as a washer between said pushrod one end and the actuating arm, said clip body having a first finger extending laterally therefrom and engaging the outer end of said pushrod one end, second and third fingers extending laterally therefrom generally parallel to said first finger and receiving said pushrod therebetween on the other side of said enlarged one end from said outer end, and first and second spring legs extending laterally from said planar clip body generally parallel to said fingers, said first and second legs being on opposite sides of said clip body opening and having outer ends bent so as to approach the axis of said clip body opening to the extent that said outer ends are spaced apart for a distance which is less than the outer diameter of said pin groove first shoulder, said second and third fingers being spaced apart a distance less than the enlarged width of said pushrod enlarged one end, said clip body being retained on said pushrod one end by said fingers and said legs so that said clip body opening is maintained substantially axially aligned with said pushrod cross hole when said clip is installed on said pushrod before complete assembly of said attachment means;

said attachment means being assembled by first installing said clip on said pushrod with said fingers and said legs retaining said clip thereon as aforesaid, then pushing said clip and said pushrod eye onto said pin, said pin tapered end extending through said clip body opening and said cross hole and between said leg outer ends and engaging said leg outer ends in camming relation to resiliently spread said legs apart, said leg outer ends after passing said first shoulder snapping into said groove and holding said pushrod eye and said clip on said pin in operative pivotal relation to transmit forces between said pushrod and the actuating arm through said pin.

3. For use in an attachment means comprising an actuating arm moveable in a plane through an arc; a pin extending from one side of said actuating arm in a direction perpendicular to the plane of movement of the actuating arm, said pin having a bearing land adjacent said actuating arm, a groove beyond said bearing land away from said actuating arm, and a tapered end extending away from said actuating arm, said tapered end defining a generally frustoconical cam surface of increasing diameter from the outer end thereof toward said groove, said tapered end at said groove defining a first shoulder forming one side wall of said groove and said bearing land defining a second shoulder forming the other side wall of said groove; a pushrod having one end enlarged and provided with a cross hole therethrough forming an eye of a diameter adapted to be received over said pin and fit about said bearing land in pivotal bearing relation; and a clip holding said pushrod on said pin, the improvement comprising:

said clip having a planar clip body provided with an opening therethrough of a diameter adapted to be received over said pin and fit about said bearing land between said pushrod one end and said actuating arm, said clip body having a first finger extending laterally therefrom and adapted to engage the outer end of said pushrod one end to prevent movement of said clip in at least one direction on said pushrod, second and third fingers extending laterally therefrom generally parallel to said first finger and adapted to receive said pushrod therebetween on the other side of said enlarged one end from said outer end and to limit movement of said clip along said pushrod toward said pushrod outer end so that said clip body opening is maintained substantially axially aligned with said pushrod cross hole when said clip is installed on said push rod, and first and second spring legs extending laterally from said planar clip body generally parallel to said fingers, said first and second spring legs being on opposite sides of said clip body opening and having outer ends bent so as to approach the axis of said clip body opening to the extent that said outer ends are spaced apart for a distance which is less than the outer diameter of said pin groove first shoulder and resist lateral removal of said clip from said pushrod;

said attachment means being assembled by first installing said clip on said pushrod so that said legs and said fingers and said planar clip body cooperatively retain said clip in position on said pushrod enlarged one end, and then pushing said clip and said pushrod eye onto said pin, said pin tapered end extending through said clip body opening and said cross hole and between said leg outer ends and engaging said leg outer ends in camming relation to resiliently spread said legs apart and then when said leg outer ends have passed said first shoulder said leg outer ends snapping into said groove and holding said pushrod eye and said clip on said pin in operative pivotal relation to transmit forces between said pushrod and said actuating arm through said pin.

* * * * *